United States Patent [19]

Ewing et al.

[11] 4,327,894
[45] May 4, 1982

[54] LINEARIZED CONTROLLED VALVES

[75] Inventors: James H. Ewing, Brockton, Mass.; William R. Clark, Hampstead, N.H.

[73] Assignee: MKS Instruments, Inc., Burlington, Mass.

[21] Appl. No.: 152,037

[22] Filed: May 21, 1980

[51] Int. Cl.³ .......................................... F16K 31/528
[52] U.S. Cl. .................................. 251/233; 251/133; 74/516
[58] Field of Search .................. 251/233, 133, 58; 74/516

[56] References Cited

U.S. PATENT DOCUMENTS 2,722,396 11/1955 Carr ........................... 251/233 X

FOREIGN PATENT DOCUMENTS 330873 6/1930 United Kingdom ............... 251/133

Primary Examiner—Arnold Rosenthal
Attorney, Agent, or Firm—James E. Mrose

[57] ABSTRACT

Servo control of a butterfly valve or the like, in which fluid flow is inherently non-linearly related to angular orientations of a vane or plug member, is effected through a function-generator mechanism interposed to render the system transfer function substantially constant. A function generator serving those purposes includes a mechanical cam-and-follower unit through which valve-controlling angular movements are maintained in a cosine-related slaving with angular movements of the rotor of an electrical servo motor.

3 Claims, 3 Drawing Figures

LINEARIZED CONTROLLED VALVES

BACKGROUND OF THE INVENTION

The present invention relates to improvements whereby the valved control of fluid flow may be automatically linearized mechanically, and, in one particular aspect, to unique and improved servo-motor controlled valving in which a cosine-function mechanism of uncomplicated and economical construction maintains a substantially constant system resolution over its operating range.

The projected "open" area of a fluid passageway valved by way of a butterfly-type vane or ball-type plug, or the like, determines the "throughput" or amount of flow under other standard conditions, and it has of course been appreciated heretofore that relationships between angular excursions of the valve stem and the related fluid flow are non-linear for such valves. In some instances, shapings of the plugs and/or valve seats may allow the opening cross-sections to be varied approximately in linear relation to the angles to which the valve members are turned, and that linear relation thus enables an associated electrical controller to drive a servo motor and actuate the valve member with a desirable substantially-constant "transfer function" and resolution. Unless some such means is provided, the intended flow control system may be rendered unstable, and, for example, a given angular adjustment as the valve is "cracking" open will tend to have a significantly greater effect upon flow than with the same amount of angular adjustment when the valve member is nearly quarter-turned to about a fully-open position. Were the electrical controller itself required to compensate for such differences, it would have to be made to exhibit appropriately-varied gain; alternatively, some variable-gear-ratio device might attempt to approximate such variable gain mechanically.

SUMMARY OF THE INVENTION

In accordance with certain aspects of the present teachings, it is recognized that the cross-sectional openings of and related flow through a butterfly or like valve are a (1-cos $\theta$) function of the angular positionings ($\theta$) of the valve member, and a compensatory cosine-generator mechanism is introduced between the motive source and valve shaft to linearize relationships between the angular inputs and resulting flow outputs. A preferred system embodiment of the invention involves an electrical controller responding to a sensed condition (such as flow, pressure or temperature) and delivering related control signals to an electrical motor which is in driving relation to the stem of a flow-governing butterfly valve through a linearizing mechanism wherein the motor rotation is caused to exhibit a nonlinearity offsetting that of the nonlinear valving. A function-generator mechanism well suited to making the required translation of angular movements comprises a slidable gear rack meshed in driving relation to a pinion fixed with the valve stem, the rack being cam-actuated to slide by amounts which are in a (1-cos $\theta$) functional relationship with the 0°–90° angular excursions of the drive motor output shaft. A crank arm rotated up to a quarter turn by the motor shaft, and carrying a cam roller at its outer end trapped within a cam slot extending transversely to the rack, conveniently develops the desired functional relationship.

Accordingly, it is one of the objects of the present invention to provide novel and improved flow-control apparatus wherein a substantially linear transfer function and resolution are effected by way of the drive of a non-linear valve through an uncomplicated function-generator mechanism which introduces offsetting non-linearity.

A further object is to provide unique actuators for butterfly valves and the like wherein rack-and-pinion and cam arrays of low-cost construction form cosine generator mechanisms which advantageously linearize their control.

BRIEF DESCRIPTION OF THE DRAWINGS

Although the aspects of this invention which are considered to be novel are expressed in the appended claims, further details as to preferred practices and as to further objects and features thereof may be most readily comprehended through reference to the following detailed description when taken in connection with the accompanying drawings, wherein:

DETAILED DESCRIPTION OF THE PREFERRED EMBODIMENTS

Figure 1:
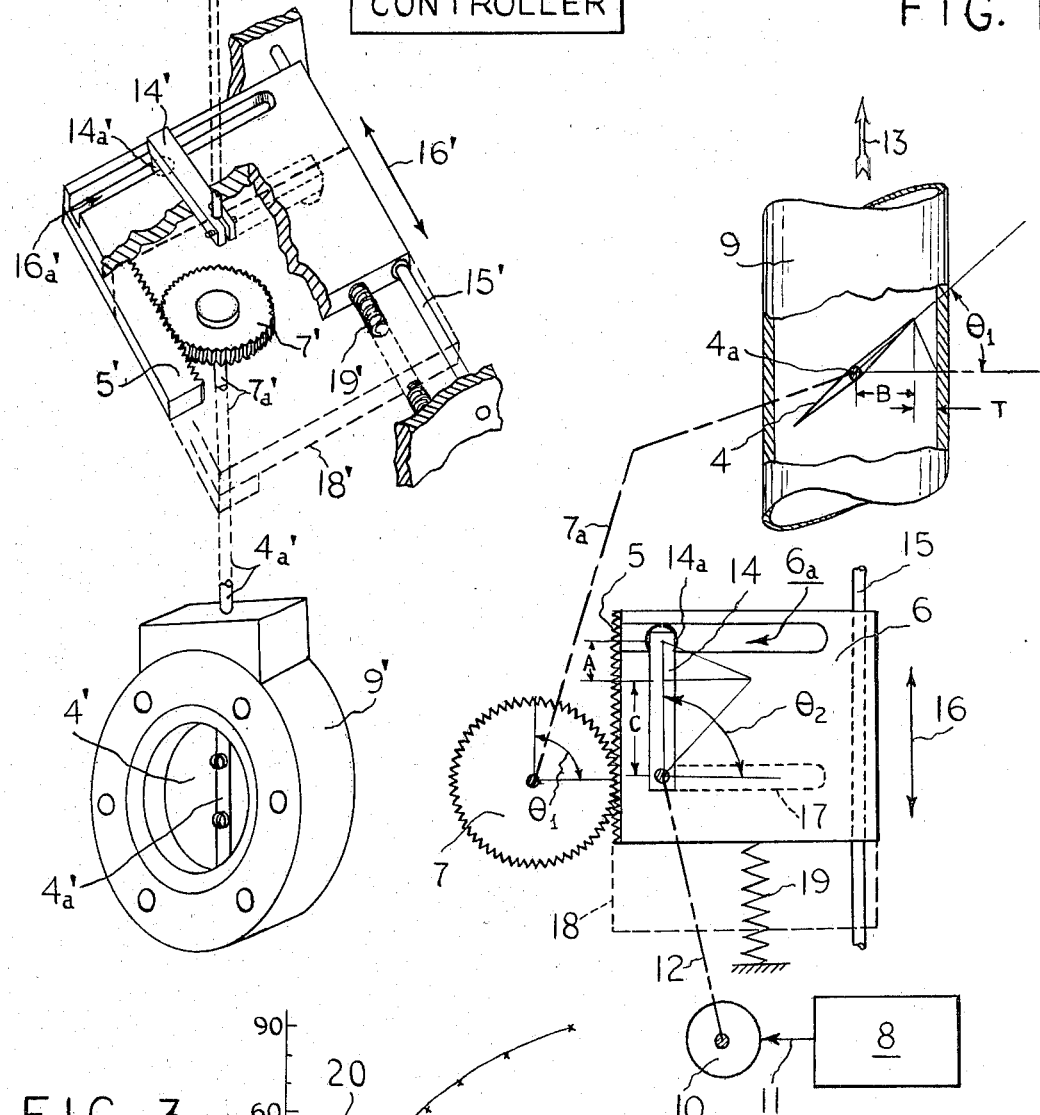
FIG. 1 portrays cooperating parts of a system for developing a substantially constant transfer function in respect of control of fluid flow by a butterfly valve in accordance with this invention, together with designations of angles and parameters which aid in an understanding of its linearizing effects.

Having reference to the drawings, wherein like reference characters designate identical or corresponding components and units throughout the plural views, and, more particularly, to FIG. 1 thereof, one embodiment of a unique arrangement for the linearized controlled valving of fluids by a butterfly-type vane or valve member 4 is shown to include a rack 5 fixed with a slide 6 and meshed in driving relation with a pinion 7 having a connection 7a which turns in synchronism the valve stem or shaft 4a for member 4. In a generally conventional manner, an electrical controller 8, which may be responsive to a sensed condition such as pressure, flow or temperature in some way associated with flow through the valved flow conduit 9, applies related electrical control signals to a servo motor 10 via a coupling 11, and, in the usual case, the motor output shafting 12 would connect essentially directly with and position the valve member 4 so as to effect related changes in the fluid flow, 13. However, the throughput, T, of a butterfly valve, which is directly proportional to its projected open area, is not linearly related to angular position, $\theta_1$, of the valve member, and, were the shaft 4a of that valve member driven directly by the servo motor shaft 12, a related non-linearity would be encountered in the attempted control unless gain and lead characteristics of the controller were somehow to be adjusted appropriately for each operating condition. For example, in relation to system resolution, the said non-linearity would be evidenced by large changes in flow per incremental angular change in the position of the valve member when it is only slightly opened, and by only relatively small changes in flow per incremental angular change in the position of the same valve member when it is almost fully opened.

In that same connection, and with reference again to FIG. 1, it may be observed that the projected opening T is a (1-cosine $\theta_1$) function of the angular opening of member 4, according to the following:
considering B+T equal to unity,
then, $1-T=B$, and $(B/1)=\cos \theta_1$, and $(1-T)/1=\cos \theta_1$, and $T=1-\cos \theta_1$.

The mechanisms interposed between the motor 10 and valve stem 4a take the foregoing into account and offset the said non-linearity problems by way of wholly mechanical provisions. The first of these, coupled serially with the motor, includes a mechanical linkage which will introduce a compensatory cosine-related function. For that purpose, a crank arm 14, rotatable clockwise through at least about a quarter turn from the illustrated position, with drive motor shaft 12, causes its outer end to traverse an effective straight distance, equal to its radius, in a non-linear manner, and the end of that crank arm is equipped with a roller 14a trapped in an accommodating transverse cam slot 6a in slide 6, so that angular movements of the crank arm will be translated into useful non-linearly related straight movements of the slide. Shaft 15 supports and guides the slide for those movements, in the directions signified at 16, and, in turn, those motions are translated into turning of pinion 7 and the valve stem 4a by the slide-mounted edge rack 5. Dashed linework 17 characterizes the position of slot 6a most remote from that illustrated in full, and comparable linework 18 characterizes the related limit of sliding travel of slide 6. A spring 19 acts to keep the gear and cam elements in engagements which suppresses backlash. Angular displacements $\theta_1$ of pinion 7, which are the same as those of the valve member 4 which it actuates, are caused to vary as a cosine-related function of angular displacements $\theta_2$ of the servo motor shaft, FIG. 1, according to the following:
considering A+C equal to unity,
then, $1-A=C=\cos \theta_2$, and $1-C=\cos \theta_2$, and $1-\cos \theta_2=C=\theta_1 k$, and the construction of the mechanism being such that $k=1/90°$, therefore, $(1-\cos \theta_2)90°=\theta_1$.

When that expression of $\theta_1$ is substituted in the aforementioned "throughput" equation $T=1-\cos \theta_1$, the result is:

$T=1-\cos [(1-\cos \theta_2)90°]$, and the rate of change of throughput T with motor shaft angle $\theta_2$ becomes:

$(dT/d\theta_2)=\sin [90°(1-\cos \theta_2)] \sin \theta_2$.

Related calculations then develop tabular data for those terms, with motor shaft angle $\theta_2$, as follows, with the table being normalized for 0 to 100% flow being 0 to 1:

| $\theta_2°$ | $[(1-\cos\theta_2)]$ | $\times 90°$ | sin | $\sin \theta_2$ | $\cos [(1-\cos\theta_2) \times 90°]$ | T | $\dfrac{dT^2}{d\theta_2}$ | $\dfrac{T}{\dfrac{dT}{d\theta_2}}$ |
|---|---|---|---|---|---|---|---|---|
| 0° | 0 | 0° | 0 | 0 | 1 | 0 | 0 | 0 |
| 5° | .0038 | .34° | .00597 | .087 | .99998 | .000018 | .00052 | .034 |
| 10° | .015 | 1.35° | .0236 | .174 | .99972 | .00028 | .0041 | .068 |
| 20° | .0603 | 5.43 | .0946 | .342 | .9955 | .0045 | .032 | .138 |
| 30° | .134 | 12.1 | .2089 | .500 | .978 | .022 | .105 | .21 |
| 40° | .2339 | 21.1 | .359 | .642 | .933 | .067 | .231 | .29 |
| 50° | .357 | 32.2 | .532 | .766 | .847 | .153 | .408 | .38 |
| 60° | .500 | 45° | .707 | .866 | .707 | .293 | .612 | .48 |
| 70° | .657 | 59.2 | .859 | .935 | .512 | .49 | .81 | .61 |
| 80° | .826 | 74.4 | .963 | .985 | .269 | .73 | .95 | .77 |
| 90° | 1 | 90° | 1 | 1 | 0 | 1 | 1 | 1 |

Figure 3:
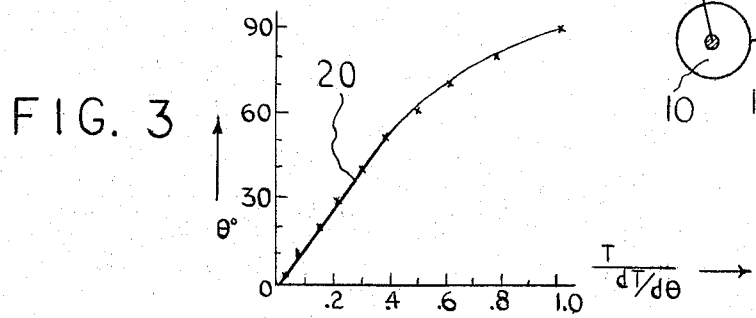
FIG. 3 is a graphical representation of relationships between angular positions of the drive motor and the ratios of valve throughput to its rate of change for such positions, in the system of FIG. 2.

Values for the last set of calculations, i.e., T/(dT/dT$_2$), are plotted in FIG. 3, along the abscissa, in relation to motor shaft angle along the ordinate, and it will be noted that there is a desired substantially linear transfer function indicated by plot 20 over the greater and most critical part of the operating range.

Figure 2:
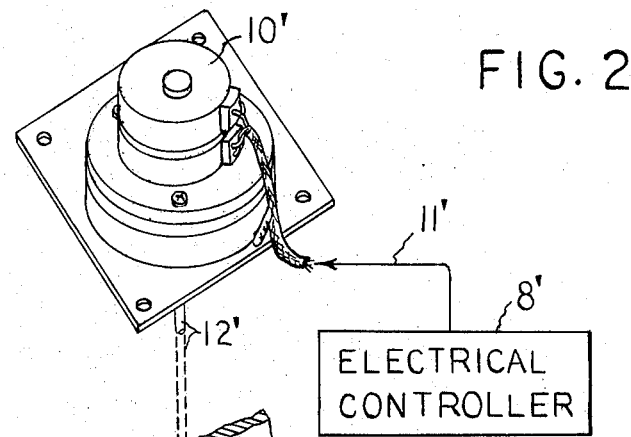
FIG. 2 provides an "exploded" pictorial view of components of an improved linearized controlled-valve system wherein the valve mounts a stacked package of a cosine function mechanism and a driving stepping motor.

The representations in FIG. 2 are of details of a system arrangement in many respects like that of FIG. 1, and corresponding relationships and parts are therefore designated by the same reference characters, with distinguishing single-prime accents being added. There, the stepping motor 10' which effects the linearized drive includes suitable gear reduction components, and its electrical actuations by controller 8' are via pulse combinations which cause it to progress or step only by accurately-defined angular amounts. Immediately below it is the crank arm 14' in cammed relation with slider 6', and, in this instance, the rack gear 5' is disposed under and inwardly of the edge of the slider, where it can mesh with the pinion 7' disposed substantially in line with the other angularly-movable shafts of the assembly.

Other flow controllers, such as plug-type valves, including ball valves, can occasion similar non-linear characteristics and may be linearized as to transfer function and resolution in similar fashion. To the extent that different amounts of control may be called for, with different types of valves, or within systems where more or less response may be desired, the rack-and-pinion stage affords a convenient means for changing gear ratios which will effect such results. Micro-switches, not shown, may be conveniently used to interrupt motor excitation and thereby avoid locking and overshoot of the cam linkage at extremes of its intended travel. Although a preferred roller and cam arrangement have been illustrated and described in respect of the cosine-function generator mechanism, equivalent crank-arm and camming devices which yield like cosine-related movements may be utilized where that would be of advantage. Accordingly, it should be understood that the specific embodiments and practices herein described have been presented by way of disclosure rather than limitation, and that various modifications, combinations and substitutions may be effected by those skilled in the art without departure in spirit or scope from this invention in its broader aspects and as set forth in the appended claims.

What we claim as new and desire to secure by Letters Patent of the United States is:

1. Linearized controlled flow-regulating apparatus comprising valving means angularly positionable within a flow passageway and controlling flow therethrough as a function of the cosine of its angular positions, motive means producing turning movements for powering angular positioning of said valving means, and a mechanical cosine-function generator mechanism translating said turning movements into angular positionings which substantially offset the cosine-function dependency of said valving means in respect of its control of said flow over at least part of its operating range, said mechanism including a linkage having a portion angularly movable at a radial distance from the axis of said turning movements and formed as part of a crank undergoing said turning movements imparted by said motive means, whereby turning of said portion in relation to a given position effects a substantially cosine-function advancing and retreating type movement of said portion in relation to said position, and said mechanism further including means converting said advancing and retreating type movement of said portion into said angular positionings of said valving means, said converting means including a movable member connected with said crank through a joint allowing at least relative angular movement therebetween, said joint including a cam slot in said movable member extending substantially parallel with the planes of turning movements swept by said crank, and said crank having an arm including a cam follower element fixed therewith and disposed within said cam slot, said movable member being slidable in directions of said advancing and retreating type movement and in accordance with a cosine-related function of said turning movements.

2. Linearized controlled flow-regulating apparatus as set forth in claim 1 wherein said linkage further includes a rack slidable with said movable member and a pinion turned by said rack and turning said valving means.

3. Linearized controlled flow-regulating apparatus as set forth in claim 2 wherein said cam slot is substantially linear and is disposed to lie respectively substantially transversely to and substantially parallel with said crank arm when said arm is near extremes of quarter-turn travel.

* * * * *